L. WARSTLER.
SAFETY DEVICE FOR COFFEE MILLS.
APPLICATION FILED FEB. 9, 1915.

1,185,743.

Patented June 6, 1916.

Witnesses
Robert Karcher.
J. H. Bishop

Inventor
Levi Warstler:
By
J. W. Bond
Attorney

UNITED STATES PATENT OFFICE.

LEVI WARSTLER, OF LOUISVILLE, OHIO, ASSIGNOR, BY MESNE ASSIGNMENTS, TO THE CANTON ELECTRIC CUT COMPANY, OF CANTON, OHIO, A CORPORATION OF OHIO.

SAFETY DEVICE FOR COFFEE-MILLS.

1,185,743.  Specification of Letters Patent.  Patented June 6, 1916.

Application filed February 9, 1915. Serial No. 6,997.

*To all whom it may concern:*

Be it known that I, LEVI WARSTLER, a citizen of the United States, residing at Louisville, in the county of Stark and State of Ohio, have invented a new and useful Safety Device for Coffee-Mills, of which the following is a specification.

My invention relates to improvements in safety devices for coffee mills and has more especial reference to a device of this character which is adapted to prevent the grinding disks from being damaged in the event that a nail or any other foreign substance is accidentally passed into the grinder.

The object of my invention is to provide a device of the character mentioned which will automatically release the stationary grinding disk causing it to rotate with the rotary grinding disk, in the event that any foreign substance is passed into the mill.

A further object is to provide a device of this character which will be simple and inexpensive to manufacture and will be effective in operation.

With these objects in view the invention consists in the novel construction and arrangement of parts, hereinafter described, illustrated in the accompanying drawings, and particularly pointed out in the appended claim, it being understood that various changes in the form, proportion, size and minor details of construction may be made within the scope of the appended claim without departing from the spirit or sacrificing any of the advantages of the invention.

Figure 1:
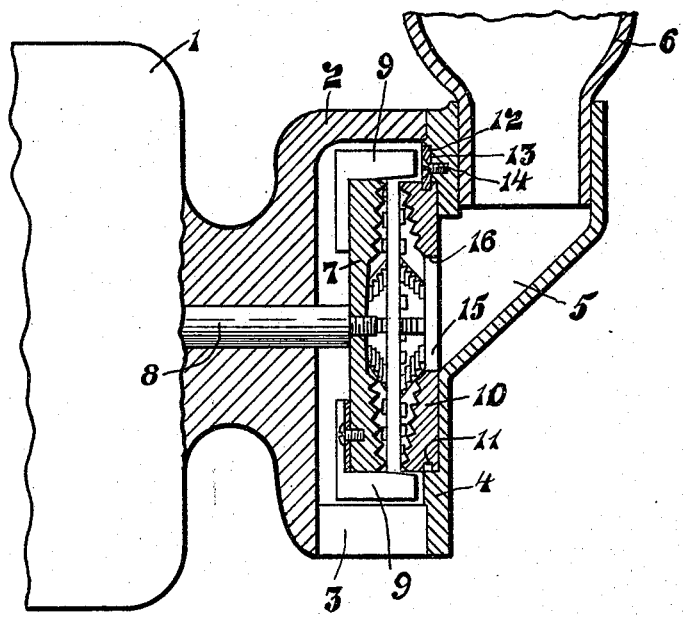
Figure 2:
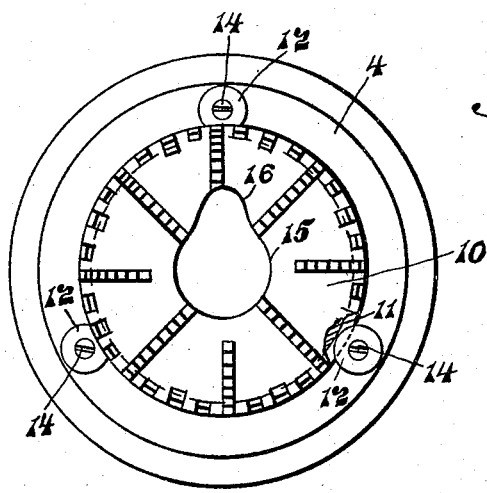
Figure 3:
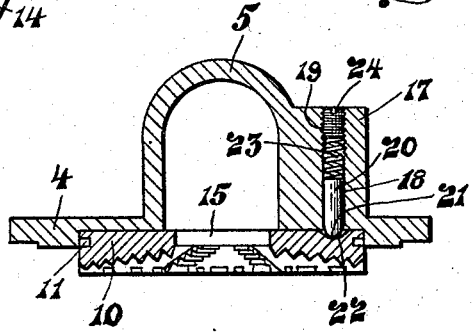

In the drawing: Figure 1 is a fragmentary sectional view of a coffee mill provided with my safety device. Fig. 2 is an elevation of the stationary grinding disk showing a portion of the casting to which it is attached. Fig. 3 is a transverse sectional view thereof.

Similar numerals of reference indicate corresponding parts throughout the several views of the drawing.

Referring more especially to the construction illustrated in the accompanying drawings, 1 indicates a portion of the motor casing, 2 indicates the casing within which the rotary disk is mounted, 3 indicates the aperture through which the ground coffee is passed, 4 the portion of the case within which the fixed grinding disk is mounted and 5 the inlet to the grinding disk. A suitable hopper 6 is preferably provided at the entrance to the inlet 5, the coffee to be ground being placed in said hopper.

The rotary disk 7 may be of any suitable design and is mounted for rotation upon the shaft 8 of the motor. If desired fans 9 may be provided upon the periphery of the rotary disk 7, said fans being for the purpose of blowing the coffee through the outlet 3.

The stationary disk 10 is provided with an annular peripheral groove 11 and is held upon the casing 4 by means of a plurality of washers 12, said washers being located in suitable countersunk recesses 13 in the casing 4 so that the outer faces of the washers are flush with the inner face of the casing 4. These washers are connected to the casing 4 by means of screws 14 which are preferably located in suitable countersunk apertures in the washers in order to prevent the screw heads from interfering with the fans 9 upon the rotary grinding disk. The stationary disk 10 is provided with a central aperture 15 through which the coffee is passed to the grinding disks from the inlet pipe 5, said aperture having an upwardly disposed elongated portion 16.

A boss 17 is provided upon the casing 4 adjacent and preferably integral with the inlet pipe 5, said boss being provided with a cylindrical passage 18, the outer portion of which is tapped as shown at 19. For the purpose of normally holding the disk 10 stationary against rotation a pin 20 provided with a tapered extremity 21 is located in the passage 18, the tapered extremity of the pin being located within a concave indentation 22 in the rear face of the disk 10. A compression spring 23 is placed between the outer extremity of the pin 21 and the headless screw 24. By adjusting the screw 24 the proper tension can be put upon the spring 23 to normally hold the pin 20 in engagement with the concave indentation 22 in the disk. Thus enough pressure is put upon the pin 20 to hold the disk 10 against rotation while coffee is being ground, but should a foreign substance, such as a nail or the like, which would be likely to damage the grinding disks, enter the mill said foreign substance would be caught between the two grinding disks and the stationary disk 10 would be caused to rotate with the rotary disk 7 the pin 21 being forced out of the concave indentation 22 in the stationary disk. It would then be necessary to stop the mill to remove the nail or other foreign substance, after which the operation of the mill could be resumed, the tapered end 21 of the pin 20 again entering the concave indentation 22 in the stationary disk and holding the same against rotation.

Although the drawings and above specification disclose the best mode in which I have contemplated embodying my invention I desire not to be limited to the details of such disclosure, for, in the further practical application of my invention, many changes in form and construction may be made, as circumstances require or experience suggests, without departing from the spirit of the invention, within the scope of the appended claim.

I claim:

A coffee mill comprising a casing and a rotary disk mounted within said casing, a normally stationary disk mounted within said casing, said normally stationary disk provided with an annular peripheral groove, a series of washers mounted within said casing, said washers being located within the groove in the normally stationary disk and yielding means for releasably restraining the normally stationary disk from rotation.

In testimony that I claim the above, I have hereunto subscribed my name in the presence of two witnesses.

LEVI WARSTLER.

Witnesses:
J. H. BISHOP,
F. W. BOND.

Copies of this patent may be obtained for five cents each, by addressing the "Commissioner of Patents, Washington, D. C."